(12) United States Patent
Ra et al.

(10) Patent No.: US 7,790,206 B2
(45) Date of Patent: Sep. 7, 2010

(54) **COMPOSITION FOR PROMOTING GROWTH OF ANIMAL COMPRISING EXTRACTS OF *ARTEMISIA CAPILLARIS* THUNBERG, *ACANTHOPANAX* AND GARLIC AND FEED COMPOSITION FOR PROMOTING GROWTH COMPRISING THE COMPOSITION**

(75) Inventors: Jeong Chan Ra, Suwon (KR); Hyeong Geun Park, Hwaseong (KR); Kyung Sun Kang, Seoul (KR)

(73) Assignee: RNL Life Science Ltd., Suwon City (KR)

( * ) Notice: Subject to any disclaimer, the term of this patent is extended or adjusted under 35 U.S.C. 154(b) by 124 days.

(21) Appl. No.: 11/791,598

(22) PCT Filed: Jun. 13, 2005

(86) PCT No.: PCT/KR2005/001790

§ 371 (c)(1),
(2), (4) Date: May 24, 2007

(87) PCT Pub. No.: WO2006/006768

PCT Pub. Date: Jan. 19, 2006

(65) Prior Publication Data

US 2008/0113034 A1    May 15, 2008

(30) Foreign Application Priority Data

Jul. 14, 2004  (KR)  ...................... 10-2004-0054876
May 6, 2005   (KR)  ...................... 10-2005-0037825

(51) Int. Cl.
*A61K 36/8962*  (2006.01)
*A61K 9/68*     (2006.01)

(52) U.S. Cl. ........................ 424/728; 424/754; 424/740
(58) Field of Classification Search ...................... None
See application file for complete search history.

(56) References Cited

U.S. PATENT DOCUMENTS 6,605,296 B1 *  8/2003  Stuckler ...................... 424/439
7,300,676 B2 * 11/2007  Chen .......................... 424/725

FOREIGN PATENT DOCUMENTS

| EP | 0813875 A    |   | 12/1997 |
|----|--------------|---|---------|
| JP | 61001356 A   | * | 1/1986  |
| JP | 07033636 A   |   | 2/1995  |
| JP | 2003040788 A |   | 2/2003  |
| KR | 20040017051 A |  | 2/2004  |
| KR | 102002/0065230 | * | 4/2004 |
| KR | 10-0514429 B1 |  | 9/2005  |

\* cited by examiner

*Primary Examiner*—Christopher R. Tate
*Assistant Examiner*—Deborah A. Davis
(74) *Attorney, Agent, or Firm*—Galgano & Associates PLLC; Thomas M. Galgano; Jessica G. Bower

(57) ABSTRACT

The present invention relates to a composition for promoting the growth of animals, comprising extracts of *Artemisia capillaris* thunberg, *Acanthopanax* and garlic, as well as a feed composition comprising the same. The composition for promoting the growth of animals shows the excellent effect of promoting the secretion of growth hormone. Particularly, when the feed composition comprising the animal growth-promoting composition is administered to livestock animals, it will show the excellent effects of body weight gain, meat quality improvement and milk production increase in the livestock animals.

4 Claims, 2 Drawing Sheets

[Figure 1]
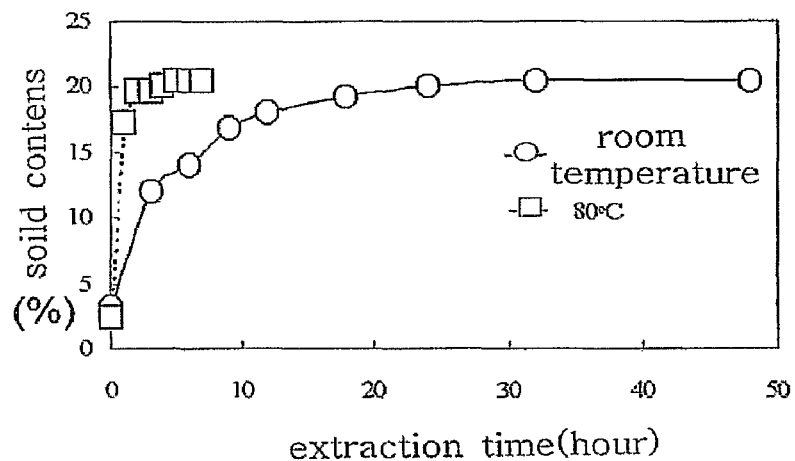
[Figure 2]
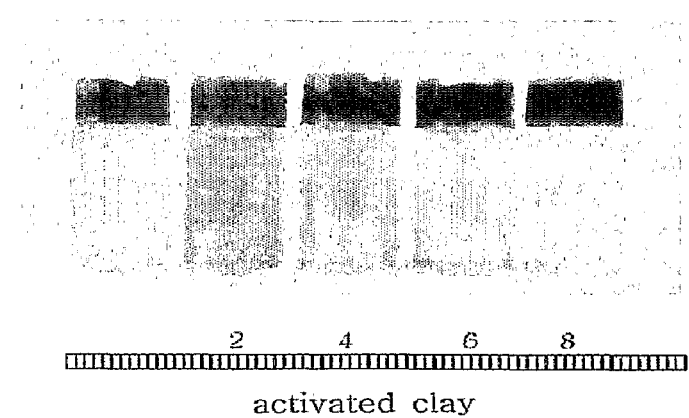
activated clay
[Figure 3]
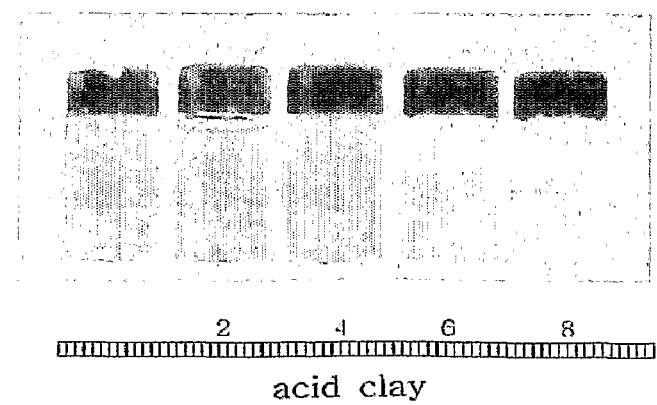
acid clay

[Figure 4]
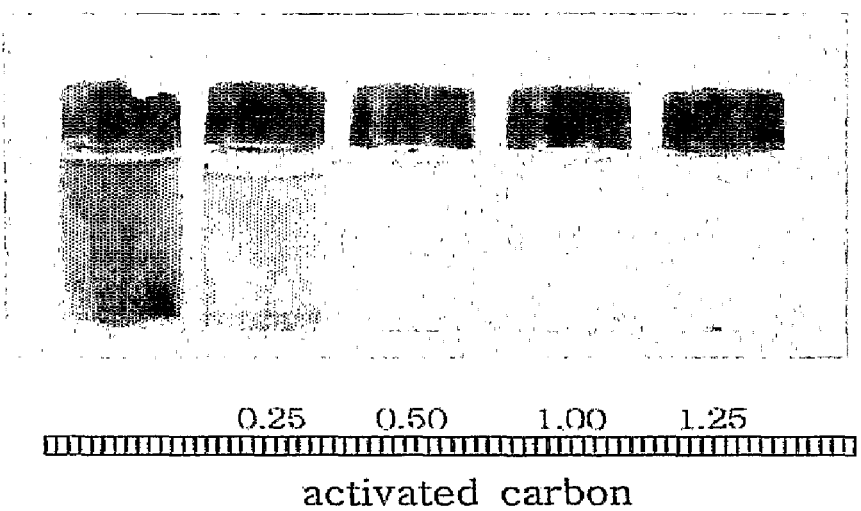

COMPOSITION FOR PROMOTING GROWTH OF ANIMAL COMPRISING EXTRACTS OF *ARTEMISIA CAPILLARIS* THUNBERG, *ACANTHOPANAX* AND GARLIC AND FEED COMPOSITION FOR PROMOTING GROWTH COMPRISING THE COMPOSITION

TECHNICAL FIELD

The present invention relates to a composition for promoting the growth of animals, comprising extracts of *Artemisia capillaris* thunberg., *acanthopanax* and garlic, as well as an animal feed composition comprising the same.

BACKGROUND ART

With recent changes in Korean eating habits caused by economic growth, the consumption of cereals, such as rice and barley, decreases, while the consumption of meats and processed milk foods (milk products) rapidly increases. Furthermore, as eating out is frequent and so-called "well-being" culture spreads, it can be said that the supply of good quality meals and milk products became necessary. However, due to high feed cost, infectious diseases, red tide phenomena, and the low price selling of imported meals with no guaranteed safety, Korean livestock farmers and culture fishermen encounter great difficulties. Thus, when highly functional feed, which has good feed efficiency, improves meat quality and increases milk production, is developed and supplied to Korean livestock farmers and culture fishermen, livestock and marine products produced using this feed will have competitive price and quality.

Growth hormones are known to perform various physiological functions, such as the growth of cells, the promotion of protein production, the promotion of lipolysis, and the promotion of milk secretion of mammals. Human growth hormones were developed as products for promoting the growth of children, and animal growth hormones were developed as agents for increasing the milk production of milking cows, increasing the efficiency of pig feed and promoting the growth of culture fishes. As the utility of growth hormones exhibiting various physiological functions as described above raises, studies on substances or compositions for promoting the secretion of the growth hormones are being actively conducted.

DISCLOSURE

Technical Problem

It is an object of the present invention to provide a composition for promoting the growth of animals, which has the excellent effect of promoting the secretion of growth hormone.

Another object of the present invention is to provide a feed composition comprising the animal growth-promoting composition, which, when administered to animals, shows the excellent effects of body weight gain, meat quality improvement and milk production increase in the animals.

Still another object of the present invention is to provide a method for extracting *Artemisia capillaris* thunberg., which is one component of the animal growth-promoting composition.

Technical Solution

To achieve the above objects, the present invention provides a composition for promoting the growth of animals, comprising as active ingredients extracts of *Artemisia capillaris* thunberg., *Acanthopanax*, as well as a feed composition comprising the animal growth-promoting composition.

The extracts of *Artemisia capillaris* thunberg., *Acanthopanax* and garlic in the inventive composition can be obtained by, for example, a method comprising the steps of: crushing each of the components into 30-50 meshes; either extracting each of the crushed materials in 3-6 times weight of water or organic solvent with an ultrasonic mill for 48-72 hours or refluxing each of the materials, and then, if necessary, filtering each of the extracts through a filter with a pore size of 0.1-10 μm, concentrating the filtrate in vacuum to a volume of ⅕-1/10 and cooling the concentrate below 30° C. The usable quality of the extracts is 20-50 brix.

Examples of organic solvents which can be used in the extraction include lower alcohols, such as ethanol, methanol and isopropyl alcohol, and at least 50% aqueous solutions of these alcohols. Preferred is ethyl alcohol or 70% ethanol.

The inventive composition may be prepared by adding a pharmaceutically acceptable carrier and the like to a mixture which has been obtained by either extracting each of *Artemisia capillaris* thunberg., *Acanthopanax* and garlic as described above and then mixing the extracts with each other, or mixing the components with each other and then extracting the mixture of the components.

The inventive composition may comprise *Artemisia capillaris* thunberg., *Acanthopanax* and garlic at a weight ratio of 1:0.1-10:0.1-10, and preferably 1:1:1.

In order to increase a pharmacological effect, the inventive composition may additionally comprise other pharmaceutically acceptable medicinal herbs or extracts thereof. In this case, the composition may also be prepared by either preparing extracts of the medicinal herbs according to the above-described extraction method and then adding the extracts to the composition, or mixing the medicinal herbs with *Artemisia capillaris* thunberg., *Acanthopanax* and garlic and then extracting the mixture according to the above-described extraction method.

Examples of medicinal herbs which may be added to the inventive composition include, but are not limited to, *Acanthopanax senticosus*, *Trigonella foencum-graecum*, *Phlomis umbrosa*, *Lycium chinense*, Safflower seeds, *Eucommia ulmoides*, *Poria cocos*, *Rubus coreannus* muquel, dodder seeds, and ginseng. These medicinal herbs may be used alone or in combination. Furthermore, the inventive composition may additionally comprise antlers or calcium in order to increase its effect.

The inventive composition may comprise a mixed extract of *Artemisia capillaris* thunberg., *Acanthopanax* and garlic in an amount of 10-99% by weight, and preferably, 20-50% by weight, based on the total weight of the composition. Also, the inventive composition may comprise the medicinal herb extracts, antlers or calcium in an amount of 1-90% by weight, and preferably 50-80% by weight, based on the total weight of the composition.

The inventive composition may be prepared into a given formulation according to a conventional method. In the preparation of the formulation, it is preferable that a mixed extract of *Artemisia capillaris* thunberg., *Acanthopanax* and garlic as active ingredients be mixed or diluted with a carrier, or encapsulated in a capsule-shaped carrier. If the carrier is used as a diluent, it may be a solid, semi-solid or liquid substance acting as a vehicle, excipient or medium for the active ingredients. Thus, the formulation may be in the form of tablets, pills, powder, elixirs, suspension, emulsion, solution, syrup, aerosol, soft or hard gelatin capsules, sterilized injection and sterilized powder. The formulation may additionally comprise fillers, anti-aggregating agents, lubricants, wetting agents, perfumes, emulsifiers, preservatives and the like. The inventive composition may be formulated by a method well known in the art, such that it can provide the rapid, sustained or delayed release of the active ingredients after administration.

The mixed extract of *Artemisia capillaris* thunberg., *Acanthopanax* and garlic as active ingredients may be administered orally or parenterally to animals, including human beings, in an amount of 10-1,000 mg/kg of body weight, preferably 70-100 mg/kg of body weight, one or several times one day.

Meanwhile, for the gain of body weight, the improvement of meat quality or the increase of milk production in livestock animals whose growth hormone secretion is to be promoted, the mixed extract of *Artemisia capillaris* thunberg., *Acanthopanax* and garlic may be administered to livestock animals and culture fishes in the form of a feed composition.

Accordingly, the present invention also provides a feed composition comprising extracts of *Artemisia capillaris* thunberg., *Acanthopanax* and garlic together with a carrier acceptable for addition to feed. The inventive feed composition may comprise extracts of *Artemisia capillaris* thunberg., *Acanthopanax* and garlic in a weight ratio of 1:0.1-10:0.1-10, and preferably 1:1:1. Also, the feed composition may comprise the mixed extract of *Artemisia capillaris* thunberg., *Acanthopanax* and garlic in an amount of 10-90% by weight, and preferably 20-50% by weight, based on the total weight of the feed composition.

The inventive feed composition containing the mixed extract of *Artemisia capillaris* thunberg., *Acanthopanax* and garlic may be added to conventional compound feed consisting of a premix of corn, soybean meal, wheat, tallow, molasses, calcium phosphate, limestone, salt, other minerals and vitamins, in a suitable amount. The inventive feed composition is preferably added in an amount of 0.005-50% by weight based on the total weight of feed in order to obtain the desired effects of body weight gain, meat quality improvement and milk production increase in feedstock animals. For the increase of effects, the inventive feed composition containing the mixed extract of *Artemisia capillaris* thunberg., *Acanthopanax* and garlic may additionally comprise other medicinal herbs or extracts thereof mentioned in connection with the composition, in the above-described amount, and may be added to conventional feed in a dry powder form, for use.

The meat of pigs raised with the inventive feed composition is thin in backfat thickness and shows improvements in intramuscular fat content, texture and meat color, and thus, improvements in meat quality and taste, and milking cows raised with the use of the inventive feed composition show the excellent effect of increasing milk production.

In another aspect, the present invention provides a method for extracting *Artemisia capillaris* which is one of the active ingredients. The inventive method for extracting *Artemisia capillaris* comprises the steps of adding to 100 g of *Artemisia capillaris* 1.5-2 liters of ethanol with a concentration of 30-80%, and extracting the solution at 80° C. for 2-24 hours. Preferably, the extraction step is performed either at room temperature for 20-28 hours or 70-80° C. for 2-6 hours. If the ethanol concentration is less than 30% or more than 80%, the problems of a decrease in extraction yield and a reduction in the amount of soluble solids can be caused. Also, if the ethanol with the above-mentioned concentration is used in an amount of less than 1.5 liters relative to 100 g of *Artemisia capillaris*, the extraction yield can be decreased, and if the ethanol is used in an amount of more than 2.5 liters, much time and energy can be required for concentration. Also, if the extraction temperature is lower than room temperature, a longer time will be required with a reduction in temperature, resulting in a reduction in productivity, and if the extraction temperature is higher than 80° C., the extraction yield will be reduced. Most preferably, the extraction step is performed either at room temperature for 20-28 hours, or at 70-80° C. for 2-6 hours.

The inventive method for extracting *Artemisia capillaris* as described above may additionally comprise, before the extraction step, the step of roasting *Artemisia capillaris* so as to remove unpleasant odors, such as green smells. The roasting step comprises heating *Artemisia capillaris* at 180-220° C. for 20-30 minutes. The roasting step can be performed with a rotary roaster such that *Artemisia capillaris* is evenly heated to prevent *Artemisia capillaris* from burning or getting scorched. The rotary roaster has a space formed therein, which can receive *Artemisia capillaris* to be roasted, and it comprises a rotatable body, a means for rotating the body, and a means for heating the body. Also, it can be understood that the rotary roaster is so known that a person skilled in the art can purchase and use one commercially available from foremost manufacturers in Korea. Medicinal herbs, such as ginseng, show not only an improvement in storage properties by the preparation of red ginseng by steaming, but also effects, such as the production of novel active substances and the improvement of flavor, and a significant number of medicinal herbs also show similar results to such results. In view of this fact, in the present invention, *Artemisia capillaris* is roasted to remove its unique unpleasant odors, such as green smells.

The *Artemisia capillaris* extract obtained according to the present invention as described above may be decolorized with activated clay, acidic clay or activated carbon. Preferably, the *Artemisia capillaris* extract may be decolorized with activated carbon. The decoloration can be performed by mixing the *Artemisia capillaris* extract with a decolorant, such as activated clay, acidic clay or activated carbon, stirring the mixture and separating the decolorant.

ADVANTAGEOUS EFFECTS

The inventive composition containing the mixed extract of *Artemisia capillaris* thunberg., *Acanthopanax* and garlic shows the excellent effect of promoting the secretion of growth hormone. Particularly, when the composition is added to the animal feed, it will show the effects of body weight gain, meat quality improvement and milk production increase in livestock animals. Thus, this composition is useful for the preparation of highly functional feed.

DESCRIPTION OF DRAWINGS

FIG. 1 is a graphic diagram comparatively showing the solid contents of *Artemisia capillaris* extracts as functions of temperature and time in the extraction of *Artemisia capillaris*.

FIG. 2 is a photograph showing *Artemisia capillaris* extracts decolorized with activated clay.

FIG. 3 is a photograph showing *Artemisia capillaris* extracts decolorized with acidic clay.

FIG. 4 is a photograph showing *Artemisia capillaris* extracts decolorized with activated carbon.

BEST MODE

The present invention will hereinafter be described in further detail by examples. It is to be understood, however, that these examples are for illustrative purpose only and are not construed to limit the scope of the present invention.

Example 1

Preparation of Composition

Dried *Artemisia capillaris* thunberg., *Acanthopanax* and garlic were crushed into a size of 30-50 meshes. 5 ml of 70% ethanol was added to 1 g of each of components having a composition given in Table 1 below, and then, extracted with an ultrasonic mill at 30° C. for 48 hours, and the liquid components of the extract were completely evaporated. The remaining solid was added and mixed with 5 ml of 50% ethanol by means of a vortexer for 10 minutes, and then used as an extract.

TABLE 1

| | |
|---|---|
| Extract 1 | *Artemisia capillaris* |
| Extract 2 | *Acanthopanax* |
| Extract 3 | Garlic |
| Extract 4 | *Artemisia capillaris* + *Acanthopanax* + garlic (weight ratio of 1:1:1) |

Test Example 1

Cell Proliferation Test (Test of Effect of Promoting Secretion of Growth Hormone)

The effect of promoting the in vitro secretion of growth hormone was measured in the following manner. To a cell line of $2 \times 10^6$ GH4C1 (ATCC CCL-82.2) cells which can subculture pituicytes, 20 μl of each of the extracts 1-4 obtained in Example 1 was added, and cultured in Ham's F12 medium at 37° C. for 1 hour so as to secrete growth hormone. The growth hormone-containing culture solution was cultured with rat chondrocytes at 37° C. for 4 hours. Then, the degree of proliferation of the cells was measured by an MTT analysis method (Kaiyoun Cai et al., Biomaterials, 23:1153-1160 (2002), thus measuring the degree of promotion of growth hormone secretion. The degree of proliferation of the cells was measured by extracting purple formazan formed by dehydrogenase in the cellular mitochondria from water-soluble tetrazolium salt with isopropyl alcohol and measuring the absorbance (O.D.,) at 570 nm with a spectrophotometer, and the results are shown in Table 2 below.

Accordingly, the higher the absorbance value, the more the cells can be seen to be proliferated, indicating that the degree of promotion of growth hormone secretion is increased. For use as a negative control, the same cell line as described above was added and cultured in 20 μl of 70% ethanol, and as a positive control, 20 μl of GHRF (growth hormone releasing factor; G6646, Sigma) which is a substance promoting the secretion of growth hormone was cultured.

TABLE 2

| Test group | O.D. |
|---|---|
| Negative control | 0.25 |
| Positive control | 1.50 |
| Extract 1 | 1.72 |
| Extract 2 | 1.65 |
| Extract 3 | 1.62 |
| Extract 4 | 1.93 |

As can be seen in Table 2 above, the mixed extract of *Artemisia capillaris* thunberg., *Acanthopanax* and garlic (extract 4) showed a remarkably higher effect on the promotion of growth hormone secretion than the use of the single extracts (extracts 1-3).

Test Example 2

Feed Efficiency in Pig Raising

In an initial stage of test, 80 three-way crossed finishing pigs each weighing about 72.14 kg were purchased and subjected to raising test for 8 weeks. The animals were divided into four groups of one control group and three test groups, each group consisting of 20 animals. The control group was administered with basic feed mainly consisting of corn-soybean meal, and the three test groups were administered with mixtures of 0.05% by weight, 0.1% by weight and 0.2% by weight of the extract 4 with the basic feed, respectively. The animals were allowed free access to water and feed. On the end of the test, the body weight and feed intake of the animals were measured to calculate average daily gain, average daily feed intake and feed efficiency, and the results are shown in Table 3 below.

TABLE 3

| | Control group | Group administered with 0.05% by weight | Group administered with 0.1% by weight | Group administered with 0.2% by weight |
|---|---|---|---|---|
| ADG (g) | 805 | 843 | 821 | 839 |
| ADFI (g) | 2607 | 2603 | 2596 | 2607 |
| Feed efficiency | 0.309 | 0.324 | 0.316 | 0.322 |

ADG: average daily gain
ADFI: average daily feed intake
Feed efficiency: ADG/ADFI As can be seen in Table 3 below, the pigs raised with the feed containing the inventive mixed extract of *Artemisia capillaris* thunberg., *Acanthopanax* and garlic showed excellent feed efficiency as compared to the control group.

Test Example 3

Effect on Improvement of Meat Quality (1) Measurement of Backfat Thickness

After completion of the test example 2, the backfat thickness at the last site of the pig's ribs was measured with a digital backfat indicator (Renco lean-meter, USA), and the results are shown in Table 4 below.

TABLE 4

| | Control group | Group administered with 0.05% by weight | Group administerd with 0.1% by weight | Group administered with 0.2% by weight |
|---|---|---|---|---|
| Average backfat thickness (mm) | 25.6 | 22.4 | 22.5 | 23.5 |

(2) Sensory Test

The sensory test of pork was performed by five panels. The pork color was measured four times for the same sample with a chromometer (Model CR-210, Minolta Co., Japan), and the intramuscular fat content was analyzed by the standards provided by the National Pork Producers Council (NPPC). Criteria for the evaluation of texture were rated on a scale of 1 (very soft) to 5 (very hard). The results are shown in Table 5 below.

TABLE 5

|  | Control group | Group administered with 0.05% by weight | Group administered with 0.1% by weight | Group administered with 0.2% by weight |
|---|---|---|---|---|
| Intramuscular fat content | 3.2 | 3.4 | 3.3 | 3.4 |
| Texture | 3.0 | 3.2 | 3.0 | 3.2 |
| Pork color | 2.3 | 3.0 | 2.5 | 2.9 |

As can be seen in Tables 4 and 5 above, the pigs raised with the feed containing the mixed extract of *Artemisia capillaris* thunberg., *Acanthopanax* and garlic according to the present invention showed an improvement in meat quality as compared to the control group.

Test Example 4

Measurement of Serum IGF-1 Levels

For the measurement of serum IGF-1 levels, a raising test was performed for 16 weeks in the same manner as in Test Example 2, and then, blood was collected from the jugular vein of 15 test animals per test group. After separating serum from the collected blood, the serum IGF-1 levels were measured with a γ-counter analyzer (COBRA 5010 Quantum, U.S.A.) and an IGF-1-D-RIA-CT kit (Biosource Europe S. A), and the results are shown in Table 6 below.

TABLE 6

|  | Control group | Group administered with 0.5% by weight | Group administered with 0.1% by weight | Group administered with 0.2% by weight |
|---|---|---|---|---|
| IGF-1 (ng/ml) | 389.1 | 425.4 | 421.4 | 426.4 |

As can be seen in Table 6 above, the pigs raised with the feed containing the inventive mixed extract of *Artemisia capillaris* thunberg., *Acanthopanax* and garlic were higher in the serum IGF-1 levels than the control group. This suggests that growth hormone was well secreted in vivo by the inventive mixed extract to secrete IGF-1 from the liver to blood.

Text Example 5

Effect on Increase of Milk Production

As test animals, Holstein milking cows at 47-279 days after delivery were divided into three groups consisting of a control group, a test group administered with the extract, and a positive control group, each group consisting of 10 animals. For the test group, 30 g of the mixed extract of *Artemisia capillaris* thunberg., *Acanthopanax* and garlic was administered orally to each individual in the milking period one time every day, and for the positive control group, 500 mg of a sustained-release recombinant bovine somatotropin (Monsanto, U.S.A.) was subcutaneously injected into an alternately selected one of the right and left sides of the ischiorectal fossa at two-week intervals. The administration amount of the concentrated feed was adjusted depending on the milk yield, and other raising conditions followed the usual practice of the test farm.

On the start and end of the test, each of the groups was measured for milk production and calculated for the rate of an increase in milk production, and the results are shown in Table 7 below.

TABLE 7

|  | Control group | Positive control group | Group administered with 30 g of extract |
|---|---|---|---|
| Parity (times/year) | 2.6 ± 0.9 | 2.6 ± 1.5 | 2.4 ± 1.4 |
| Lactation (days) | 13.6 ± 38.6 | 156.6 ± 58.9 | 140 ± 55.8 |
| Initial milk production (kg/day) | 30.4 | 26.4 | 29.4 |
| Final milk production (kg/day) | 30.8 | 33.5 | 34.6 |
| Increase (%) in milk production | 101 | 127 | 118 |

As can be seen in Table 7 above, the test group showed milk production which is lower than the positive control group but higher than the control group. This result suggests that the milk secretion was promoted by the inventive mixed extract of *Artemisia capillaris* thunberg., *Acanthopanax* and garlic so as to increase the milk production for about 3 months.

Example 2

Extraction of *Artemisia capillaris* thunberg (1) Extraction Solvent

The extraction yields and soluble solid contents of *Artemisia capillaris* extracts which have been obtained with initial extraction solvents with varying ethanol concentrations of 0, 20, 40, 60, 80 and 100%, were compared to each other, and the results are shown in Table 8 below.

TABLE 8

| Ethanol concentration (%) | Solid content (%) | Soluble solid content (° Bx) |
|---|---|---|
| 0 | 17.3 ± 0.5 | 2.2 |
| 20 | 15.4 ± 1.8 | 3.0 |
| 40 | 18.1 ± 0.7 | 3.5 |
| 60 | 16.3 ± 0.9 | 11.6 |
| 80 | 14.9 ± 0.2 | 13.7 |
| 100 | 8.2 ± 0.3 | 9.3 |

As can be seen in Table 8 above, when the extraction is performed with distilled water (ethanol concentration of 0%) as an extraction solvent, an extraction yield of 17.3% was then shown, and when the extraction solvent with an ethanol concentration of 20% was used, the extraction yield was then slightly reduced to 15.4%. However, at an ethanol concentration of 40%, the extraction yield was increased to 18.1% which is the highest extraction yield. At ethanol concentrations of more than 40%, the extraction yield showed a tendency to decrease, and the use of 100% ethanol showed the lowest extraction yield of 8.2%. On the other hand, in the measurement results of the brix of extracts, which indicate the soluble solid contents, the increase up to 80% in the ethanol content of the extraction solvent showed the increase of the soluble solid content from 2.2° Bx in the distilled water extraction to 13.7° Bx. In the extraction with 100% ethanol, the soluble solid content was slightly decreased to 9.3° Bx.

These results are thought to be because when the extraction is performed at ethanol concentrations of less than 80%, fine insoluble particles which are extracted in ethanol-containing solvents but suspended in water without complete dissolution will be more present than water-soluble components.

(2) Extraction Temperature and Time

The solid contents of extracts as a function of extraction time in room temperature extraction with a stirrer and in heat extraction with a reflux cooler were compared to each other, and the results are shown in FIG. 1.

As shown in FIG. 1, in the heat extraction at 80° C. with a reflux cooler, the solid content of the *Artemisia capillaris* extract showed a tendency to continuously increase with an increase in extraction time so that the 5-hour extraction showed the highest extraction yield of 22.4%. Then, there was no great increase in the extraction yield. On the other hand, the extraction with stirring at room temperature showed the highest extraction yield of 10.8% at 24 hours of extraction, and then, no great change in the extraction yield.

Example 3

Removal of Unpleasant Odors from *Artemisia capillaris* Extract by Roasting

*Artemisia capillaris* was roasted with a rotary roaster at 200° C. for 25 minutes. 100 g of the roasted *Artemisia capillaris* was added to 2 liters of 40% ethanol, and the solution was extracted with a reflux cooler at 80° C. for 3 hours and concentrated to about 30° Bx. In this case, the extraction yield was about 43%. This yield was seen to be slightly reduced as compared to a yield of 48.5% (yield in two-times extraction) in the case where *Artemisia capillaris* was extracted without roasting, however, this is the comparison between the results of the first extraction, and thus, is not considered to directly mean a reduction in the extraction reduction. Also, the roasting showed the effect of removing a significant amount of unpleasant odors, such as green smells, from the flavor of the extract.

Example 4

Decoloration Test (1) Decoloration Test with Activated Clay

Each of 0, 2, 4, 6 and 8 g of activated clays was added to 10 ml of an *Artemisia capillaris* extract with a soluble solid content of about 3-4° Bx and suspended at room temperature for about 1 hour. The suspensions were filtered and the colors of the filtrates were compared to each other. The results are shown in FIG. 2.

As could be seen in FIG. 2, the increase in the amount of activated clays added to 10 ml of the *Artemisia capillaris* extract showed an increase in decoloration effect, but the activated clays showed slightly insignificant decoloration.

(2) Decoloration Test with Acidic Clay

Each of 0, 2, 4, 6 and 8 g of acidic clays was added to 10 ml of an *Artemisia capillaris* extract with a soluble solid content of about 3-4° Bx and suspended at room temperature for about 1 hour. The suspensions were filtered and the colors of the filtrates were compared to each other. The results are shown in FIG. 3.

As could be seen in FIG. 3, the increase in the amount of acidic clay added to 10 ml of the *Artemisia capillaris* extract showed an increase in decoloration effect, and the acidic clays showed an excellent decoloration effect but slightly high turbidity, as compared to the activated clays.

(3) Decoloration Test with Activated Carbon

Each of 0, 2, 4, 6 and 8 g of activated carbons was added to 10 ml of an *Artemisia capillaris* extract with a soluble solid content of about 3-4° Bx and suspended at room temperature for about 1 hour. The suspensions were filtered and the colors of the filtrates were compared to each other. The results are shown in FIG. 4.

As could be seen in FIG. 4, the activated carbons for decoloration were much better in the activated clays and acidic clays tested as described above, and thus, the addition of more than 0.5 g of the activated carbons to 10 ml of the *Artemisia capillaris* extract was sufficient to show a high decoloration effect.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The inventive composition containing the mixed extract of *Artemisia capillaris* thunberg., *Acanthopanax* and garlic shows the excellent effect of promoting the secretion of growth hormone. Particularly, when the composition is added to the animal feed, it will show the effects of body weight gain, meat quality improvement and milk production increase in livestock animals. Thus, this composition is useful for the preparation of highly functional feed.

The invention claimed is:

1. A composition for promoting the secretion of growth hormones in animals, which comprises effective amounts of extracts of *Artemisia capillaries* thunberg, *Acanthopanax* and garlic as active ingredients, wherein the extracts of *Artemisia capillaries* thunberg, *Acanthopanax* and garlic are at a weight ratio of 1:0.1-10:0.1-10.

2. The composition of claim 1, which additionally comprises an extract of at least one component selected from the group consisting of *Acanthopanax senticosus*, *Trigonella foencum-graecum*, *Phlomis umbrosa*, *Lycium chinense*, Safflower seeds, *Eucommia ulmoides*, *Poria cocos*, *Rubus coreannus* muquel, dodder seeds, ginseng, antlers and calcium, in an amount of 1-90% by weight based on the total weight of the composition.

3. The composition of claim 1, which comprises 10-99% by weight of the extracts, with the remainder being pharmaceutically acceptable carrier.

4. The composition of claim 1, which comprises 10-99% by weight of the extracts, with the remainder being carrier acceptable for addition to feed.

* * * * *